(12) United States Patent
Alexander et al.

(10) Patent No.: US 9,389,865 B1
(45) Date of Patent: *Jul. 12, 2016

(54) ACCELERATED EXECUTION OF TARGET OF EXECUTE INSTRUCTION

(71) Applicant: International Business Machines Corporation, Armonk, NY (US)

(72) Inventors: Khary J. Alexander, Poughkeepsie, NY (US); Fadi Y. Busaba, Poughkeepsie, NY (US); Brian W. Curran, Saugerties, NY (US); David S. Hutton, Tallahassee, FL (US); Edward T. Malley, New Rochelle, NY (US); Brian R. Prasky, Campbell Hall, NY (US); John G. Rell, Jr., Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,476

(22) Filed: Dec. 28, 2015

Related U.S. Application Data

(63) Continuation of application No. 14/599,693, filed on Jan. 19, 2015.

(51) Int. Cl.
*G06F 15/00* (2006.01)
*G06F 9/30* (2006.01)
*G06F 9/40* (2006.01)

(52) U.S. Cl.
CPC ........ *G06F 9/30145* (2013.01); *G06F 9/30101* (2013.01); *G06F 9/30181* (2013.01)

(58) Field of Classification Search
None
See application file for complete search history.

(56) References Cited

U.S. PATENT DOCUMENTS

| 4,025,771 | A | | 5/1977 | Lynch, Jr. et al. |
| 5,303,356 | A | * | 4/1994 | Vassiliadis .......... G06F 9/30152 712/214 |
| 5,471,593 | A | | 11/1995 | Branigin |
| 6,367,067 | B1 | * | 4/2002 | Odani ..................... G06F 8/445 712/24 |
| 6,851,043 | B1 | * | 2/2005 | Inoue .................... G06F 9/3836 712/217 |

(Continued)

FOREIGN PATENT DOCUMENTS

EP 0440908 A2 8/1991

OTHER PUBLICATIONS

Alexander et al., "Accelerated Instruction Execution", U.S. Appl. No. 14/599,693, filed Jan. 19, 2015, pp. 1-27.

(Continued)

*Primary Examiner* — George Giroux
(74) *Attorney, Agent, or Firm* — Steven F. McDaniel

(57) ABSTRACT

As disclosed herein a method, executed by a processor, for accelerated instruction execution includes retrieving an execute instruction including a register reference and a reference to a target instruction, retrieving the target instruction, decoding the execute instruction using an instruction pipeline, decoding the target instruction using the instruction pipeline, associating the register reference to the target instruction, and executing the target instruction using the register reference as a source operand modifier. The instruction pipeline is configured such that it allows the target instruction to continue processing without waiting for the register reference to be resolved. The contents of the referenced register may be retrieved in a later stage of the instruction pipeline, and the target instruction may be modified and executed. An apparatus corresponding to the described method is also disclosed herein.

1 Claim, 4 Drawing Sheets

(56) References Cited

U.S. PATENT DOCUMENTS

| | | |
|---|---|---|
| 7,290,121 B2 | 10/2007 | Kromer |
| 8,078,846 B2 | 12/2011 | Kishore et al. |
| 8,239,661 B2 | 8/2012 | Abernathy et al. |
| 8,281,112 B2 | 10/2012 | Yoshida et al. |
| 8,464,030 B2 | 6/2013 | Busaba et al. |
| 2003/0212881 A1* | 11/2003 | Walterscheidt ..... G06F 9/30072 712/226 |
| 2005/0081017 A1 | 4/2005 | Rupley et al. |
| 2013/0339689 A1 | 12/2013 | Srinivasan et al. |
| 2014/0075157 A1 | 3/2014 | Barry et al. |

OTHER PUBLICATIONS

IBM Appendix P, list of patents and patent applications treated as related, Feb. 9, 2016, 2 pages.

* cited by examiner

Saved Cycles

300a

| MVC | | D₁(L,B₁),D₂(B₂) | | | | [SS-a] |
|---|---|---|---|---|---|---|
| 'D2' | L | B₁ | D₁ | B₂ | D₂ |
| 0 | 8 | 16 | 20 | 32 | 36 | 47 |

$\text{MVC} \quad D_1(L,B_1),D_2(B_2) \quad [SS\text{-}a]$

| EX | R₁,D₂(X₂,B₂) | | | | [RX-a] |
|---|---|---|---|---|---|
| '44' | R₁ | X₂ | B₂ | D₂ |
| 0 | 8 | 12 | 16 | 20 | 31 |

FIG. 3B

ACCELERATED EXECUTION OF TARGET OF EXECUTE INSTRUCTION

BACKGROUND OF THE INVENTION

The present invention relates generally to the field of information processing, and more particularly to accelerating instruction execution.

An instruction cycle is the process by which a computer retrieves a program instruction from its memory, determines what actions the instruction requires, and carries out those actions. In many modern CPUs, instructions are not processed one at a time; instead, the instructions are processed in an instruction pipeline. Rather than executing a complete instruction before starting the next instruction, the machine passes a sequence of instructions through a number of stages, each of which performs a part of the overall instruction. These stages of the pipeline typically perform activities like instruction fetch, instruction decode, instruction mapping, instruction queuing, reading a register file, and the like.

SUMMARY

As disclosed herein a method, executed by a processor, for accelerated instruction execution includes retrieving an execute instruction including a register reference and a reference to a target instruction, retrieving the target instruction, decoding the execute instruction using an instruction pipeline, decoding the target instruction using the instruction pipeline, associating the register reference to the target instruction, and executing the target instruction using the register reference as a source operand modifier. The instruction pipeline is configured such that the pipeline allows the target instruction to continue processing without waiting for the register reference to be resolved. The contents of the referenced register may be retrieved in a later stage of the instruction pipeline, and the target instruction may be modified and executed. An apparatus corresponding to the described method is also disclosed herein.

BRIEF DESCRIPTION OF THE SEVERAL VIEWS OF THE DRAWINGS

FIG. 3A is a text diagram illustrating one example of a format of a move character (MVC) instruction, in accordance with an embodiment of the present invention;

FIG. 3B is a text diagram illustrating one example of a format of an execute (EX) instruction, in accordance with an embodiment of the present invention;

DETAILED DESCRIPTION

The execute instruction is a powerful instruction that can be used to modify a target instruction prior to the target instruction being processed. The execute instruction includes a general register and an address corresponding to the location of a target instruction to be processed. The execute instruction may modify the target instruction using the contents of the general register prior to the target instruction being processed.

In one embodiment, the execute instruction is the EX instruction on the IBM z/Architecture®. When an execute instruction is processed by an instruction pipeline, the execute instruction moves through the various pipelined stages of the instruction pipeline. One of the later stages in the pipeline, prior to instruction execution, is the register read stage where the contents of the register referenced in the execute instruction are retrieved.

The target instruction of an execute instruction, also known as the subject of the execute instruction, may require the contents of the register referenced in the execute instruction early in the decode stages of the instruction pipeline. If the target instruction follows closely behind the execute instruction and requires the register reference in the execute instruction for early decoding, the target instruction must receive the contents of the register referenced in the execute instruction before the target instruction can proceed through the instruction pipeline. It has been observed that the target instruction of an execute instruction is delayed in the pipeline while waiting for the contents of the register referenced in the execute instruction to become available. The embodiments disclosed herein provide a method for accelerated execution of the execute instruction and similar instructions.

Figure 1:
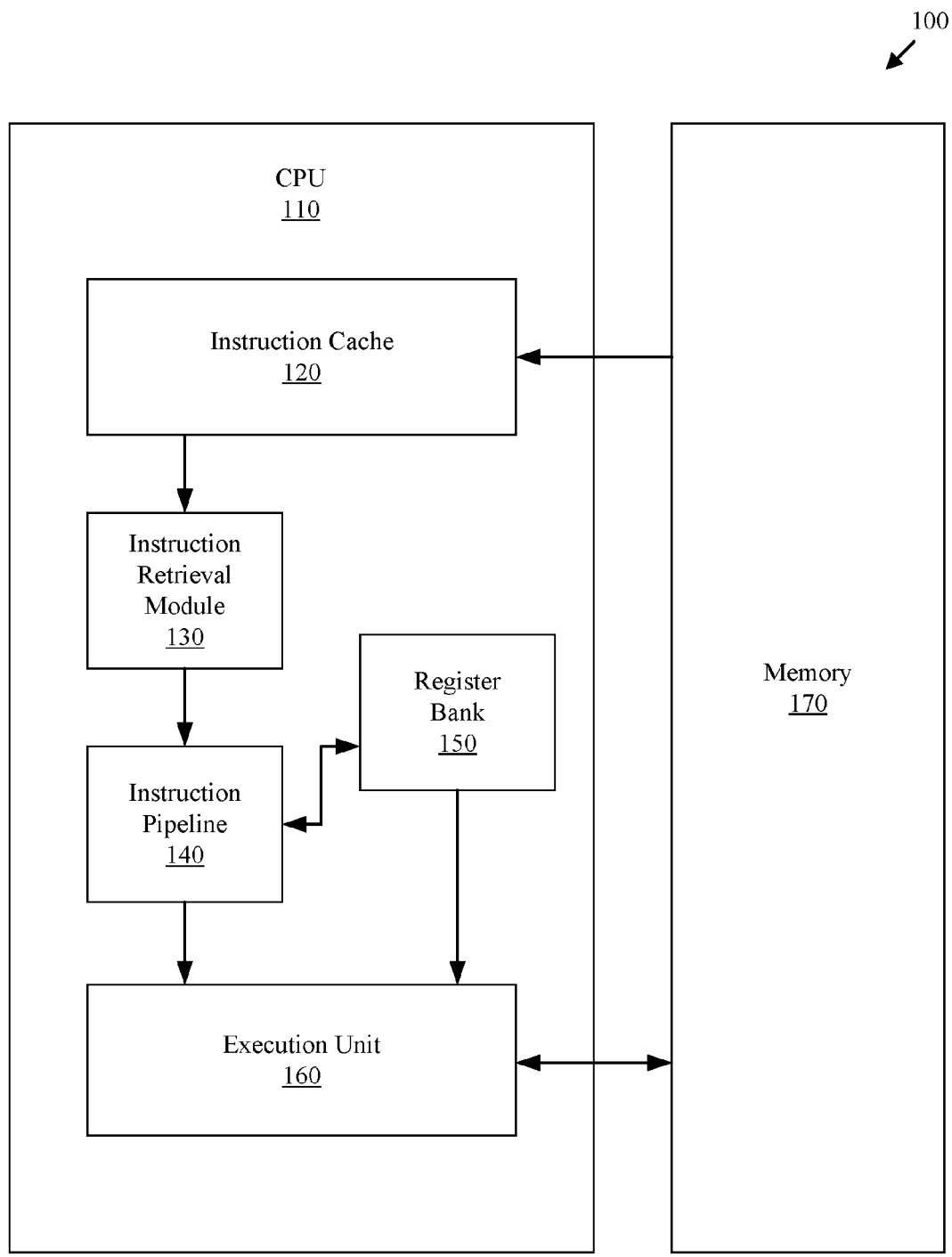
FIG. 1 is a block diagram depicting various components of one example of an instruction processing environment in which at least some of the embodiments disclosed herein may be deployed.

FIG. 1 is a block diagram of one embodiment of an instruction processing environment 100. As depicted, the instruction processing environment 100 includes a CPU 110, an instruction cache 120, an instruction retrieval module 130, an instruction pipeline 140, a register bank 150, an execution unit 160, and memory 170. The instruction processing environment 100 is one example of an environment in which at least some of the embodiments disclosed herein may be deployed.

The CPU 110 is the portion of the computer where most calculations take place. The CPU 110 carries out the instructions of a computer program. The CPU 110 includes modules (e.g., circuits) responsible for receiving instructions from a program, decoding the instructions into several sequential steps, and enabling the computer's memory, arithmetic/logic units, I/O devices, and the like to respond to a program's instructions as the program instructions are executed.

In some embodiments, program instructions are preloaded to an instruction cache 120 from memory 170. The instruction cache 120 may be internal, high-speed memory. Loading program instructions into the instruction cache 120 prior to the instruction being executed may reduce the latency of instruction retrieval.

Each instruction must be fetched (i.e., retrieved) before being executed. In some embodiments, fetching of an instruction for processing is handled by an instruction retrieval module 130. In one embodiment, the instruction retrieval module 130 uses an instruction pointer (e.g., a program counter) to locate the instruction to be fetched from the instruction cache 120 and placed in the instruction pipeline 140. At the conclusion of the fetch operation, the instruction pointer may be updated to reference the next instruction to be fetched from the instruction cache 120. In some embodiments, the current instruction is an execute instruction, and the instruction pointer is altered prior to retrieving the target instruction. In other embodiments, the target instruction is retrieved without altering the instruction pointer.

Once an execute instruction is available to the instruction pipeline 140, the process of decoding the execute instruction using one or more decoding stages of the instruction pipeline 140 may begin. An execute instruction may include a register reference, and a reference to a target instruction. The contents of the register reference may be obtained from the register bank 150 during the instruction decoding process. The execute instruction may modify the target instruction using the contents of the referenced register prior to the target instruction being run.

After the target instruction has been processed by the instruction pipeline 140, the target instruction may be executed by an execution unit 160. In some embodiments, the execution unit 160 is a separate module. In one embodiments, the execution unit 160 reads data from memory, and writes results obtained from executing the target instruction to memory.

Figure 2A:
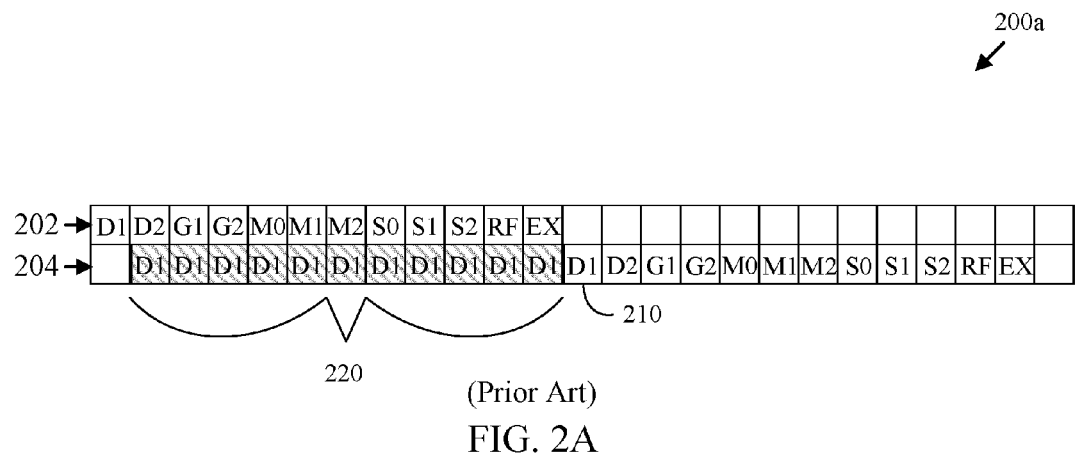
FIG. 2A is a table illustrating the operation of one example of a prior art instruction pipeline.

FIG. 2A is a table 200a illustrating the operation of one example of a prior art instruction pipeline. The instruction pipeline includes numerous stages through which an instruction passes as it is prepared for execution. In the depicted example, D1 and D2 are decode stages; G1 and G2 are grouping stages; M0, M1, and M2 are mapper and rename stages; S0, S1, and S2 are age matrix and issue stages; RF is a register file read stage; and EX is an execute stage.

As depicted, the table 200a illustrates two instructions moving through an instruction pipeline. The first row represents an execute instruction 202 [e.g., an EX R2,MOVE instruction] being processed by an instruction pipeline. The second row represents the target of the execute instruction 202, namely a target instruction 204 [e.g., a MVC TARGET (0),SOURCE instruction] as processed by a prior art instruction pipeline. In this example, the execute instruction 202 is used to modify the length field of the target instruction 204 prior to the target instruction 204 being processed.

In one embodiment, the register referenced in the execute instruction 202 is non-zero, and bits 8-15 of the target instruction 204 are logically ORed with bits 56-63 of the general register. In another embodiment, the general register is a zero, and therefore the target instruction 204 is processed without being altered and without delay. The target instruction 204 can be various instructions, such as move character (MVC), translate and test (TRT), compare logical character (CLC), compare logical immediate (CLI), and the like. A common use of the execute instruction 202 is to provide a length for a move character (MVC) instruction 204 at runtime rather than providing the length of the move instruction at the time of program compilation.

In one embodiment, the modification of the length field is accomplished by logically ORing the contents of the register referenced in the execute instruction 202 (i.e., R2) with the length specified in the target move instruction 204 (i.e., '0' in this example). However, in the depicted embodiment, the contents of the register referenced in the execute instruction 202 are not available until the register read stage (RF) for the execute instruction 202 is complete. The contents of the register are obtained from the register bank 150 of FIG. 1 and are provided to the target instruction 204 when the execute stage (EX) for the execute instruction 202 is processed. The contents of the register are provided to the target instruction 204 in the cycle 210. Consequently, decoding the target instruction 204 (i.e., the MVC instruction in this example) is delayed in the first decoding stage (D1) for the target instruction 204 for 11 cycles (220) while waiting for the contents of the register to become available. The first decoding stage (D1) for the target instruction 204 is resumed during cycle 210, and is completed when the execute stage (EX) for the target instruction 204 is completed. In this example, a total of 24 cycles was required to process an execute instruction 202 and the target of the execute instruction 204.

Figure 2B:
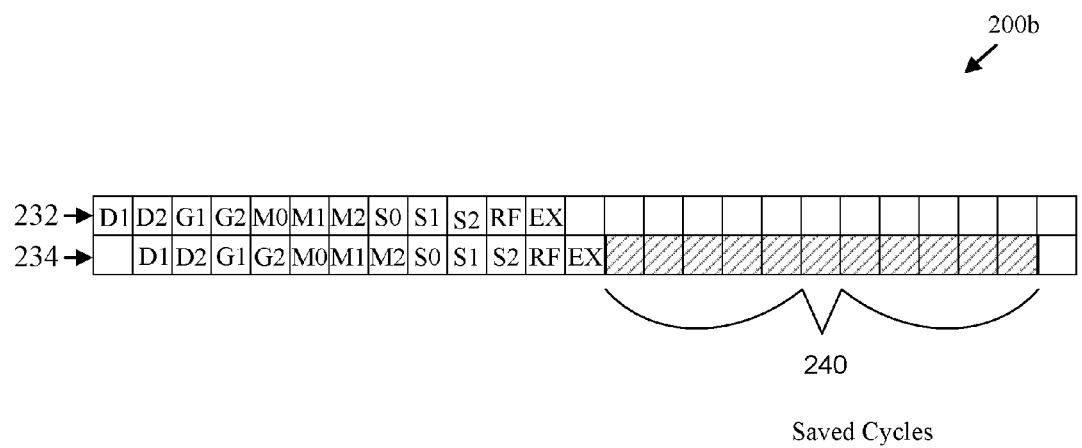
FIG. 2B is a table illustrating the operation of one example of an accelerated instruction pipeline, in accordance with an embodiment of the present invention.

FIG. 2B is a table 200b illustrating the operation of one example of an accelerated instruction pipeline. As depicted, the table 200b demonstrates two instructions moving through an accelerated instruction pipeline. In the depicted embodiment, the first row of the table represents an execute instruction 232 being processed by an accelerated instruction pipeline, and the second row of the table represents a second instruction 234, such as a target instruction, being processed by an accelerated instruction pipeline. The first decoding stage (D1) for the second instruction 234 may determine that the second instruction 234 is the target instruction of the execute instruction 232 being decoded in the instruction pipeline. Thus, the instruction pipeline may be configured to treat the target instruction 234 as a special case. The second decoding stage (D2) for the target instruction 234 may be responsible for associating the register reference from the execute instruction 232 to the target instruction 234 as an additional source operand modifier.

If any resources are required to complete the processing of the target instruction 234, the second decoding stage (D2) for the target instruction 234 may assume a default selected value for resource allocation, and assign resources for the target instruction according to the selected value. For example, to complete execution, a move instruction may require memory. The operand length field of a move instruction may indicate the amount of memory that must be allocated for the move instruction to be processed. The operand length associated with the move instruction may not have been determined, and therefore, a maximum possible memory size may be assumed when allocating the memory resource. In some situations, the target instruction may require no additional resources.

The register read stage (RF) for the target instruction 234 may obtain the contents of the register indicated by the register reference. In some embodiments the contents of the register are obtained from the register bank 150 as depicted in FIG. 1. Part of the target instruction 234 may be modified using one or more bits from the contents of the register. The part of the target instruction 234 being modified may include a length operand, an immediate operand, a mask operand, or a register.

In one embodiment, the execute instruction 232 [e.g., an EX R2,MOVE instruction] references a target instruction 234 that is a move character instruction [e.g., a MVC TARGET (0),SOURCE instruction]. In this embodiment, the length field is modified by logically ORing the low order eight bits from the contents of the register referenced in the execute instruction 232 (i.e., R2) with the length specified in the target move instruction 234 (i.e., '0' in this example). In some embodiments, the target instruction 234 is executed after associating the register reference to the target instruction 234 as an additional source operand modifier. In other embodiments, the target instruction 234 is executed without associating the register reference to the target instruction 234. If the association of a source operand modifier causes the target instruction 234 to exceed a specified limit for the number of operands that can be processed in a single issue operation, the contents of the register indicated by the register reference may be obtained by taking an extra cycle to read the extra operand using a double issue operation (two cycle issue operation).

Referring again to FIG. 1, while continuing to refer to FIG. 2B. The target instruction 234 may require the contents of the register reference prior to execution; however, obtaining the contents of the register may not be possible until a later stage in the instruction pipeline. In some embodiments, the register reference corresponding to the execute instruction 232 is appended to the target instruction 234 as an additional source operand modifier. Associating the register reference with the target instruction 234 enables the instruction pipeline 140 to continue processing the target instruction 234 without waiting for the register reference associated with the execute instruction 232 to be resolved. In some embodiments, the target instruction 234 is modified in the later stages of the instruction pipeline, using the contents of the register indicated by the register reference. In some embodiments, the contents of the register corresponding to the register reference are obtained from the register bank 150.

Associating the register reference to the target instruction 234, and allowing the instruction pipeline to continue processing the target instruction 234 without waiting for the register reference to be resolved may result in the execute instruction 232 and the target instruction 234 running to completion using fewer cycles. For example, processing an execute instruction 234 using instruction acceleration may result in saved cycles 240. In the depicted example, the execute instruction and the target instruction 234 were processed with a savings of 11 cycles over the example depicted in FIG. 2A.

FIG. 3A is a text diagram illustrating one example of a format of a move character (MVC) instruction 300a. As depicted, the MVC instruction 300a includes groupings of instruction bits that may be decoded and processed by the instruction pipeline 140 of FIG. 1. Instruction bits 0-7 comprise the instruction opcode ('D2') which identifies the instruction being decoded. Instruction bits 8-15 (L) identify the operand length, i.e., the number of bytes to be moved from a source location to a target location. The length operand (L) may contain a value of 0 to 255 which corresponds to moving 1 to 256 bytes in memory. Instruction bits 16-19 ($B_1$) identify the base register number for the first operand of the MVC instruction 300a. Instruction bits 20-31 ($D_1$) identify the displacement value for the first operand of the MVC instruction 300a. Instruction bits 32-35 ($B_2$) identify the base register number for the second operand of the MVC instruction 300a. Instruction bits 36-47 ($D_2$) identify the displacement value for the second operand of the MVC instruction 300a.

The first operand of the MVC instruction 300a identifies the beginning of the target memory location (i.e., the sum of the contents of register $B_1$ and $D_1$). The second operand of the MVC instruction 300a identifies the beginning of the source memory location (i.e., the sum of the contents of register $B_2$ and $D_2$). The L operand identifies the number of bytes to be moved from the source memory location to the target memory location (i.e., the number of bytes moved is L+1 bytes). The MVC instruction 300a moves L+1 bytes, one byte at a time, from the source memory location to the target memory location.

FIG. 3B is a text diagram illustrating one example of a format of an execute (EX) instruction 300b. As depicted, the EX instruction 300b includes groupings of instruction bits that may be decoded and processed by the instruction pipeline 140 of FIG. 1. Instruction bits 0-7 comprise the instruction opcode (in this case '44') which identifies the instruction being decoded. Instruction bits 8-11 ($R_1$) identify the register number of the first operand of the EX instruction 300b. Instruction bits 12-15 ($X_2$) identify an index register number for the second operand of the EX instruction 300b. Instruction bits 16-19 ($B_2$) identify the base register number for the second operand of the EX instruction 300b. Instruction bits 20-31 ($D_2$) identify the displacement value for the second operand of the EX instruction 300b.

The EX instruction 300b may be used to modify a single instruction (i.e., a target instruction) using the contents of the register ($R_1$) of the first operand. The address of the target instruction to be modified may be identified by the second operand of the EX instruction 300b (i.e., the sum of the contents of register $B_2$, the contents of register $X_2$, and $D_2$). When the $R_1$ field is not zero, bits 56-63 of the contents of $R_1$ are logically ORed with instruction bits 8-15 of the target instruction (e.g., the L field of FIG. 3A). In some embodiments, the logical ORing alters the execution of the target instruction without altering the contents of $R_1$ or the target instruction in storage. When the $R_1$ value is zero, no logical ORing takes place and the target instruction identified by the second operand of the execute instruction is executed without being modified.

The MVC instruction 300a is one example of an instruction that may be the target of an EX instruction 300b. In some embodiments, a MVC instruction is the target of an EX instruction, and the number of characters moved is determined by logically ORing the contents of the L field of the MVC instruction with the contents of the register identified by the $R_1$ field of the EX instruction. In other embodiments, a MVC instruction is the target of an EX instruction, and the $R_1$ field of the EX instruction is zero, enabling the target instruction of the EX instruction to be executed without being modified.

Figure 4:
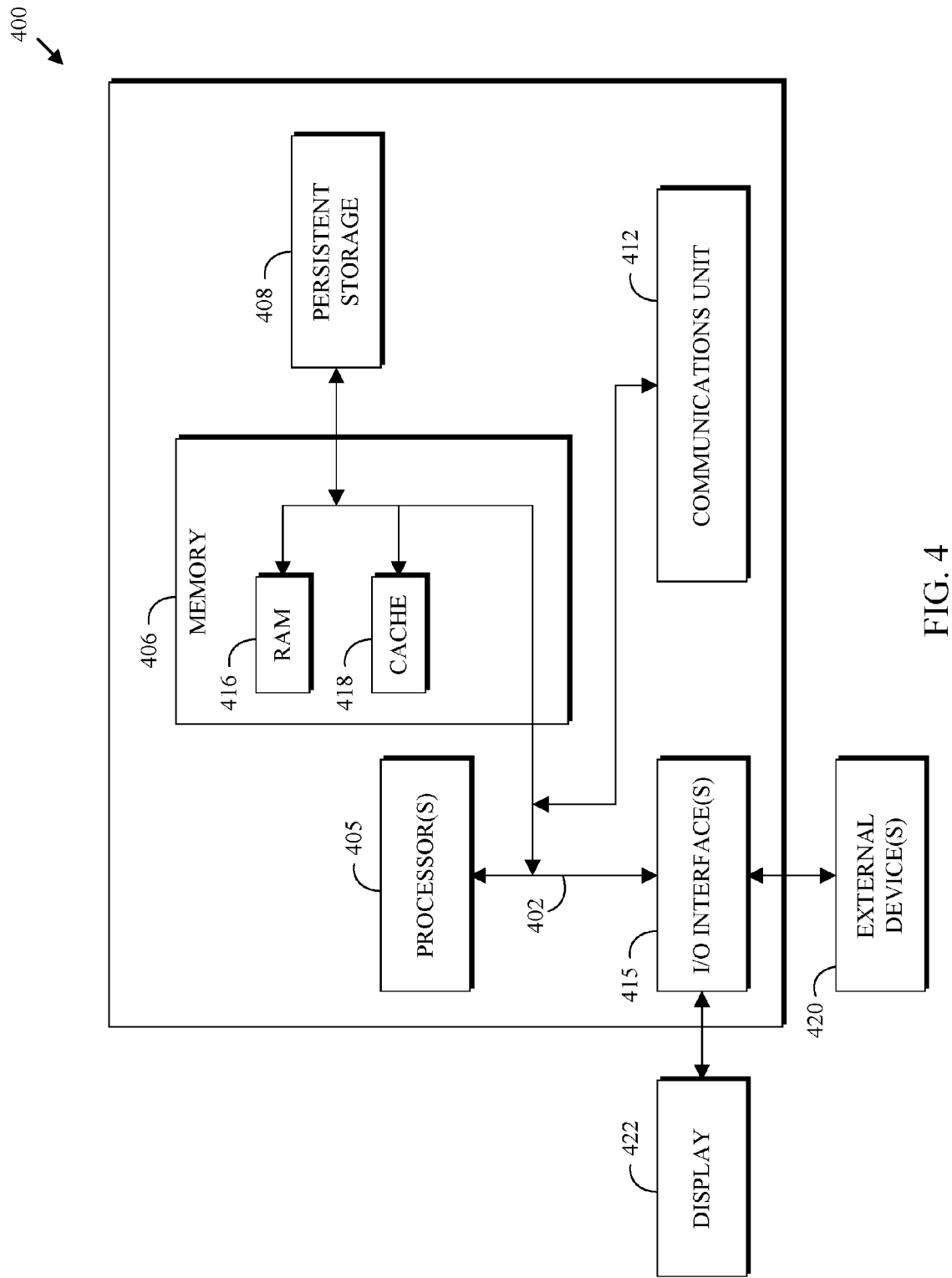
FIG. 4 is a block diagram depicting various components of one embodiment of a computer suitable for executing the methods disclosed herein, in accordance with an embodiment of the present invention.

FIG. 4 is a block diagram depicting various components of one embodiment of a computer suitable for executing the methods disclosed herein, in accordance with an embodiment of the present invention. The computer 400 may include one embodiment of the CPU 110 depicted in FIG. 1. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 405, memory 406, persistent storage 408, communications unit 412, and input/output (I/O) interface(s) 415. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 405 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 415 allows for input and output of data with other devices that may be connected to computer 400. For example, I/O interface 415 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 415. I/O interface(s) 415 also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A method, executed by a computer, for accelerated execution of an execute instruction, the method comprising:
   retrieving the execute instruction comprising a register reference and a reference to a target instruction;
   retrieving the target instruction, wherein a maximum value is assumed for a length operand of the target instruction, and resources are assigned assuming the maximum value, and wherein the length operand of the target instruction is altered by logically ORing the length operand with contents of a register indicated by the register reference, and the contents comprise one or more bits from the register;
   decoding the execute instruction using one or more decoding stages in an instruction pipeline;
   decoding the target instruction using the one or more decoding stages in the instruction pipeline, wherein the instruction pipeline is further configured to continue processing the target instruction without waiting for the register reference to be resolved, and a part of the target instruction is modified in a later stage of the instruction pipeline, using the contents of the register indicated by the register reference, and wherein the part of the target instruction corresponds to one of the length operand, an immediate operand, a mask operand, and the register;
   associating the register reference to the target instruction, wherein the register reference is appended to the target instruction as an additional source operand modifier, and wherein, if a number of sources for the target instruction exceeds a specified limit, the contents of the register indicated by the register reference are obtained using a double issue operation; and
   executing the target instruction using the register reference as a source operand modifier, wherein the target instruction is executed without modification if the register reference is zero.

* * * * *